(12) United States Patent
Kim et al.

(10) Patent No.: US 12,219,646 B2
(45) Date of Patent: Feb. 4, 2025

(54) OPERATION METHOD OF RELAY UE FOR REMOTE UE

(71) Applicant: LG Electronics Inc., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 17/636,295

(22) PCT Filed: Aug. 21, 2020

(86) PCT No.: PCT/KR2020/011168
§ 371 (c)(1),
(2) Date: Feb. 17, 2022

(87) PCT Pub. No.: WO2021/034142
PCT Pub. Date: Feb. 25, 2021

(65) Prior Publication Data
US 2022/0304099 A1    Sep. 22, 2022

(30) Foreign Application Priority Data
Aug. 22, 2019 (KR) .................. 10-2019-0103122

(51) Int. Cl.
*H04W 76/27* (2018.01)
*H04W 76/30* (2018.01)
*H04W 88/04* (2009.01)

(52) U.S. Cl.
CPC ........... *H04W 76/27* (2018.02); *H04W 76/30* (2018.02); *H04W 88/04* (2013.01)

(58) Field of Classification Search
CPC ..... H04W 76/11; H04W 76/30; H04W 76/22; H04W 76/27; H04W 76/32; H04W 76/34;
(Continued)

(56) References Cited

U.S. PATENT DOCUMENTS

| 2018/0234524 A1 | 8/2018 | Cheng et al. |
| 2019/0037636 A1 | 1/2019 | Kim et al. |
| (Continued) | | |

FOREIGN PATENT DOCUMENTS

WO    WO2017099833    6/2017

OTHER PUBLICATIONS

Intel, "Solution of 5GC Capable UE behind 5G-RG connected to 5GC via NG-RAN/W-5GAN," S2-1810426 (revision of S2-18xxxx), Presented at SA WG2 Meeting SA2 #129, Oct. 15-19, 2018, Dongguan, China, 9 pages.
(Continued)

*Primary Examiner* — Quoc Thai N Vu
(74) *Attorney, Agent, or Firm* — Fish & Richardson P.C.

(57) ABSTRACT

Provided in one disclosure of the present specification is an operation method of a relay user equipment (UE) for a remote UE. The method may comprise a step in which the relay UE receives, from a base station, a radio resource control (RRC) reconfiguration message or an RRC connection reconfiguration message. The RRC reconfiguration message or the RRC connection reconfiguration message may include identification information of a data radio bearer (DRB) shared with the remote UE and information on a protocol data unit (PDU) session which must be deleted or released in the DRB. The method may comprise a step in which an access stratum (AS) layer of the relay UE relays, to a non-access stratum (NAS) layer, information that a user plane (UP) connection of the PDU session was released, on the basis of the received RRC reconfiguration message or the RRC connection reconfiguration message.

10 Claims, 22 Drawing Sheets

(58) Field of Classification Search
CPC . H04W 28/0252; H04W 76/00; H04W 80/02; H04W 92/10; H04W 92/18; H04W 76/25; H04W 88/04; H04L 67/14; H04L 67/143
See application file for complete search history.

(56) References Cited

U.S. PATENT DOCUMENTS

| | | | |
|---|---|---|---|
| 2020/0022194 A1* | 1/2020 | Wang | H04W 76/12 |
| 2020/0260325 A1* | 8/2020 | Futaki | H04W 36/00695 |
| 2021/0251036 A1* | 8/2021 | Shi | H04W 76/30 |

OTHER PUBLICATIONS

ZTE, "Bearer Configuration at Relay UE in feD2D," R2-1700801, Presented at 3GPP TSG-RAN WG2 Meeting #97, Athens, Greece, Feb. 13-17, 2017, 4 pages.

* cited by examiner

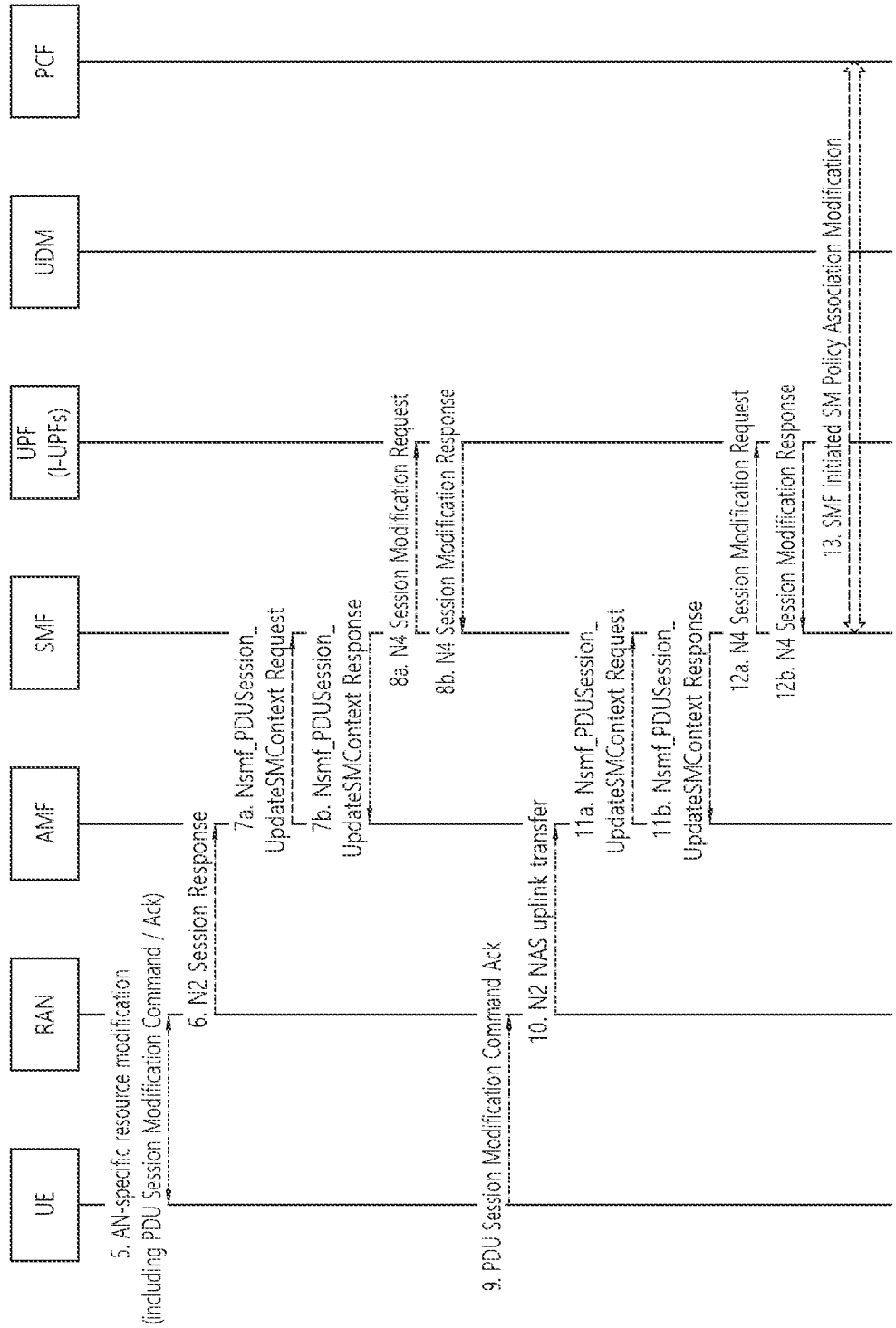

OPERATION METHOD OF RELAY UE FOR REMOTE UE

CROSS-REFERENCE TO RELATED APPLICATIONS

This application is a National Stage application under 35 U.S.C. § 371 of International Application No. PCT/KR2020/011168, filed on Aug. 21, 2020, which claims the benefit of Korean Patent Application No. 10-2019-0103122, filed on Aug. 22, 2019. The disclosures of the prior applications are incorporated by reference in their entirety.

TECHNICAL FIELD

The present specification relates to mobile communications.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
NAS procedures related to AMF include the following.
Registration management and access management procedures. AMF supports the following functions.
Secure NAS signal connection between UE and AMF (integrity protection, encryption)
2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

Meanwhile, due to an increase in user requirements for a Social Network Service (SNS), communication between UEs at a physically close distance, i.e., Device-to-Device (D2D) communication is required.

In addition, for the remote UE in the shadow area, any UE may operate as a relay UE.

If the relay UE and the remote UE share and use a Data Radio Bearer (DRB), even when the PDU session of the relay UE is deactivated, the relay UE must maintain the DRB for the remote UE. In this case, the NAS layer of the relay UE may not recognize whether the PDU session is deactivated.

As a result, the core network considers the PDU session to be inactive, but the relay UE considers the PDU session to be still active, resulting in a state mismatch of the PDU session.

SUMMARY

Accordingly, an object of the present specification is to propose a method for solving the above-described problems.

In order to solve the above-described problems, a disclosure of the present specification provides a method for a Relay User Equipment (UE) to operate for a Remote UE. The method may include receiving, by the Relay UE, a Radio Resource Control (RRC) reconfiguration message or an RRC connection reconfiguration message from a base station. The RRC reconfiguration message or the RRC connection reconfiguration message may include identification information of a Data Radio Bearer (DRB) shared with the Remote UE and information on a Protocol Data Unit (PDU) session to be deleted or released in the DRB. The method may include delivering, by an Access Stratum (AS) layer of the Relay UE to a Non-Access Stratum (NAS) layer of the Relay UE, information that a User Plane (UP) connection of the PDU session is released, based on the received RRC reconfiguration message or the RRC connection reconfiguration message.

In order to solve the above-described problems, a disclosure of the present specification provides a chipset mounted on a Relay User Equipment (UE). The chipset may include at least one processor; and at least one memory for storing instructions and operably electrically connectable to the at least one processor. The instructions, based on being executed by the at least one processor, may perform operations comprising: receiving, by the Relay UE, a Radio Resource Control (RRC) reconfiguration message or an RRC connection reconfiguration message from a base station. The RRC reconfiguration message or the RRC connection reconfiguration message may include identification information of a Data Radio Bearer (DRB) shared with the Remote UE and information on a Protocol Data Unit (PDU) session to be deleted or released in the DRB. The operations may include delivering, by an Access Stratum (AS) layer of the Relay UE to a Non-Access Stratum (NAS) layer of the Relay UE, information that a User Plane (UP) connection of the PDU session is released, based on the received RRC reconfiguration message or the RRC connection reconfiguration message.

In order to solve the above-described problems, a disclosure of the present specification provides a Relay User Equipment (UE). The Relay UE may include a transceiver; at least one processor; and at least one memory for storing instructions and operably electrically connectable to the at least one processor. The instructions, based on being executed by the at least one processor, may perform operations comprising: receiving, by the Relay UE, a Radio Resource Control (RRC) reconfiguration message or an RRC connection reconfiguration message from a base station. The RRC reconfiguration message or the RRC connection reconfiguration message may include identification information of a Data Radio Bearer (DRB) shared with the Remote UE and information on a Protocol Data Unit (PDU) session to be deleted or released in the DRB. The operations may include delivering, by an Access Stratum (AS) layer of the Relay UE to a Non-Access Stratum (NAS) layer of the Relay UE, information that a User Plane (UP) connection of the PDU session is released, based on the received RRC reconfiguration message or the RRC connection reconfiguration message.

In order to solve the above-described problems, a disclosure of the present specification provides a non-volatile computer-readable storage medium having recorded thereon instructions. The instructions, when executed by one or more processors mounted, cause the one or more processors to perform operation comprising: receiving, by the Relay UE, a Radio Resource Control (RRC) reconfiguration message or an RRC connection reconfiguration message from a base station. The RRC reconfiguration message or the RRC connection reconfiguration message may include identification information of a Data Radio Bearer (DRB) shared with the Remote UE and information on a Protocol Data Unit (PDU) session to be deleted or released in the DRB. The operations may include delivering, by an Access Stratum (AS) layer of the Relay UE to a Non-Access Stratum (NAS) layer of the Relay UE, information that a User Plane (UP) connection of the PDU session is released, based on the received RRC reconfiguration message or the RRC connection reconfiguration message.

According to the disclosure of the present specification, it is possible to solve the problems of the prior art.

BRIEF DESCRIPTION OF THE DRAWINGS

FIGS. 6a and 6b show a modification procedure for a PDU session.

DETAILED DESCRIPTION

Figure 1:
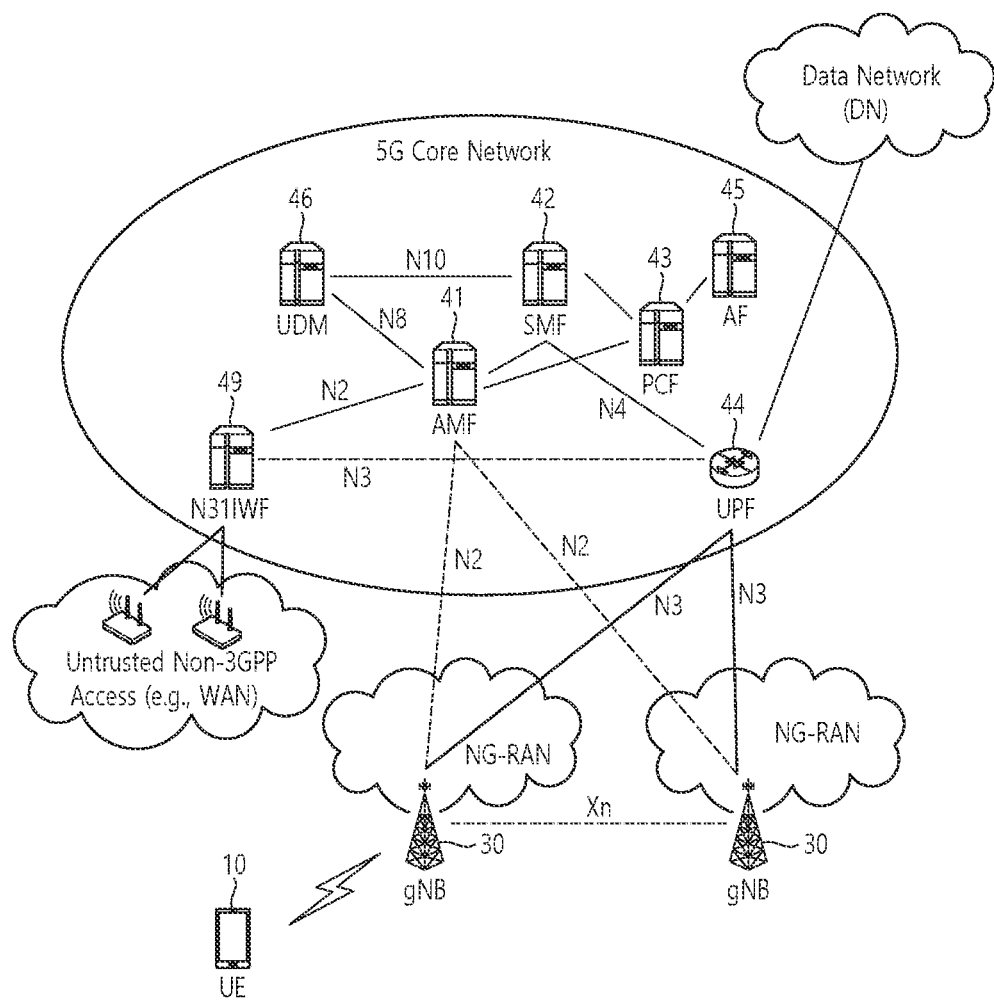
FIG. 1 is a structural diagram of a next-generation mobile communication network.
Figure 2:
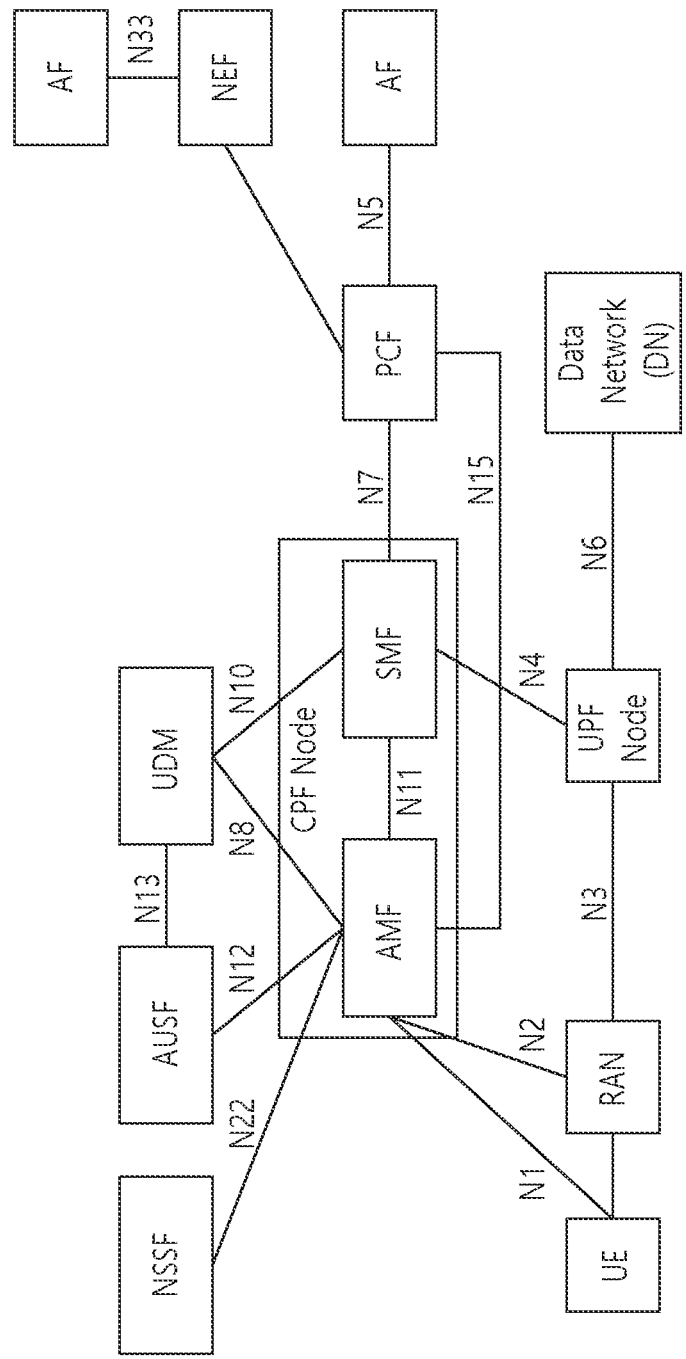
FIG. 2 is an exemplary diagram illustrating a predicted structure of a next generation mobile communication in terms of a node.
Figure 3:
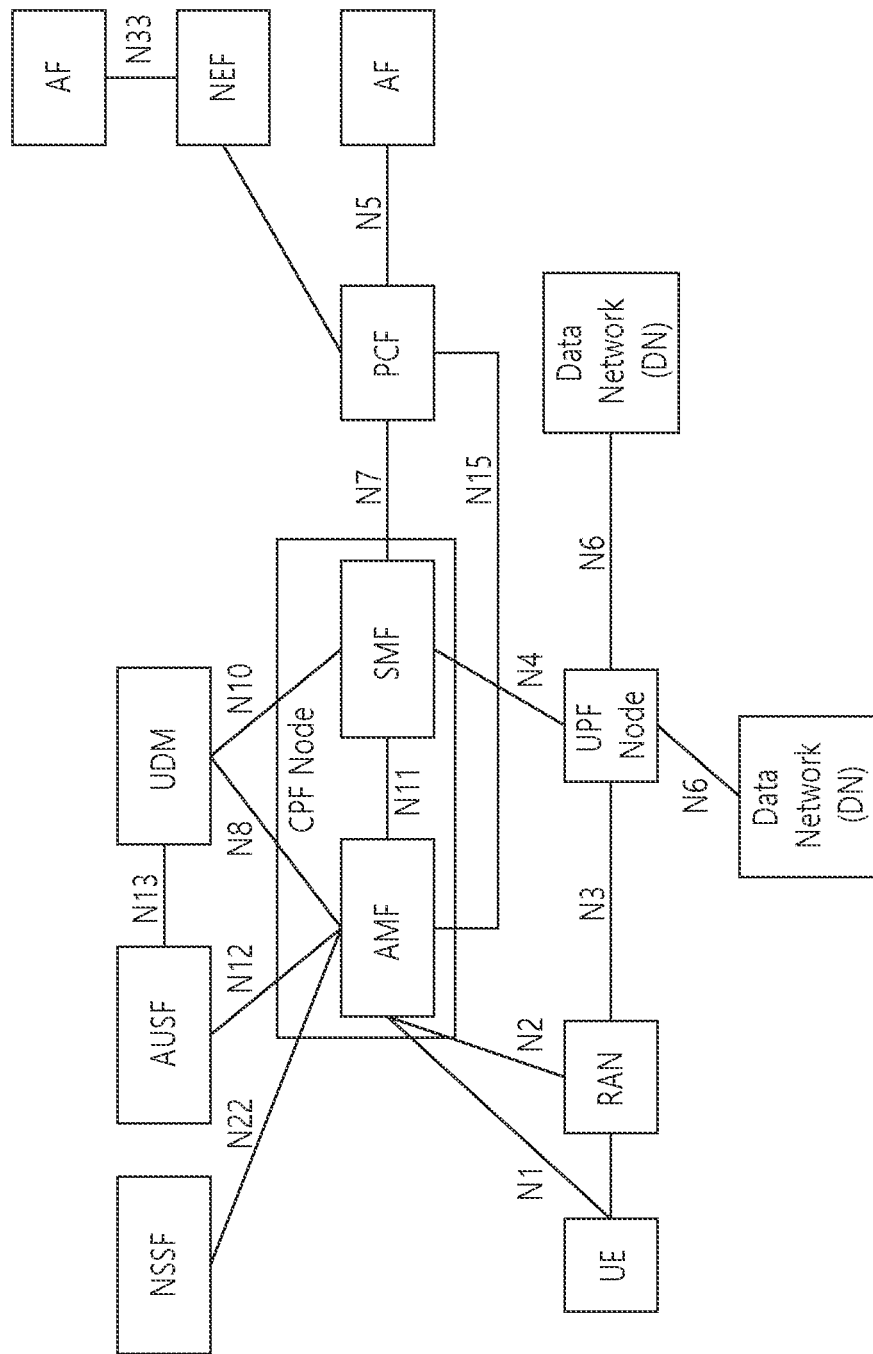
FIG. 3 is an exemplary diagram illustrating an architecture for supporting simultaneously access two data networks.
Figure 4:
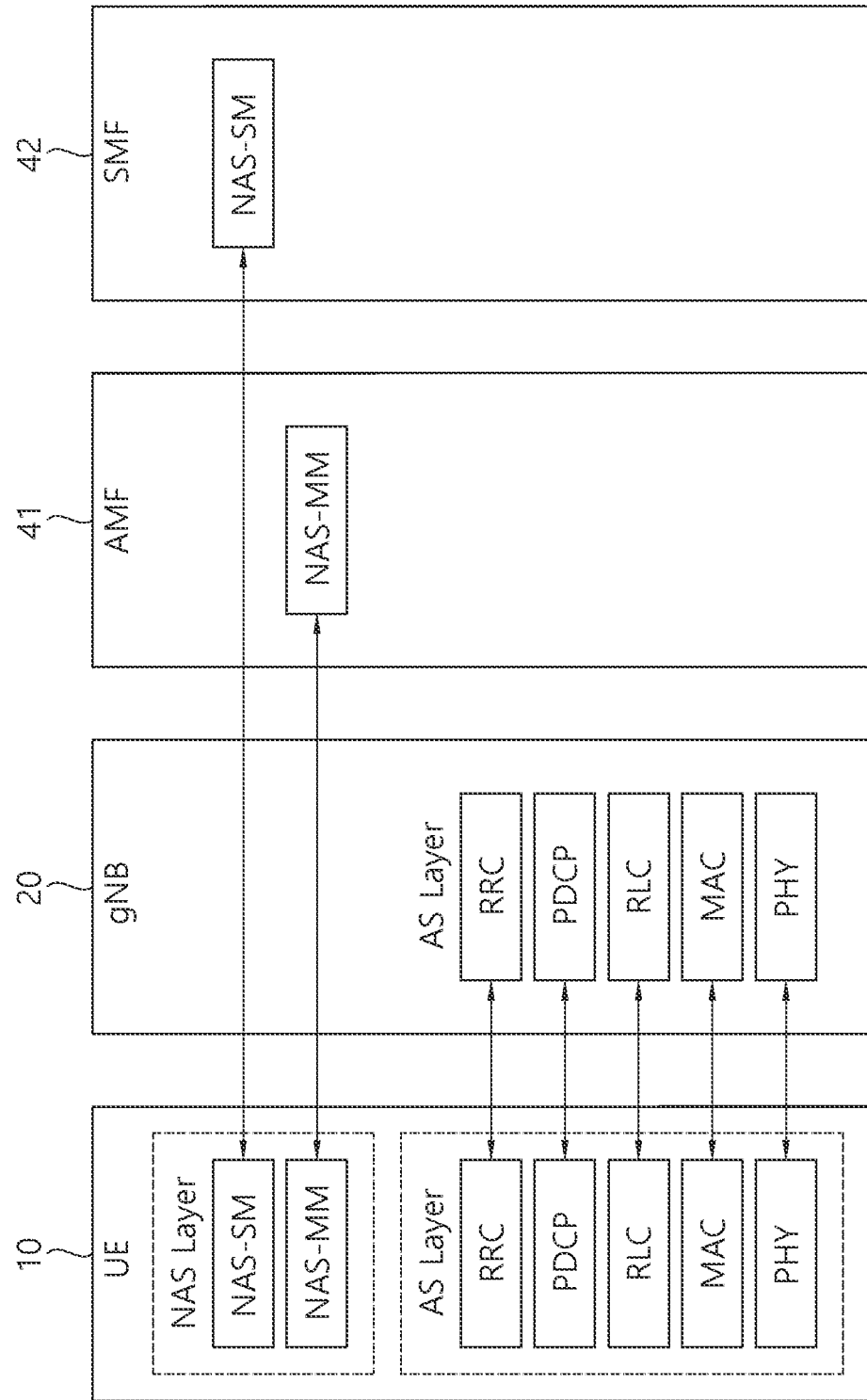
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 5A:
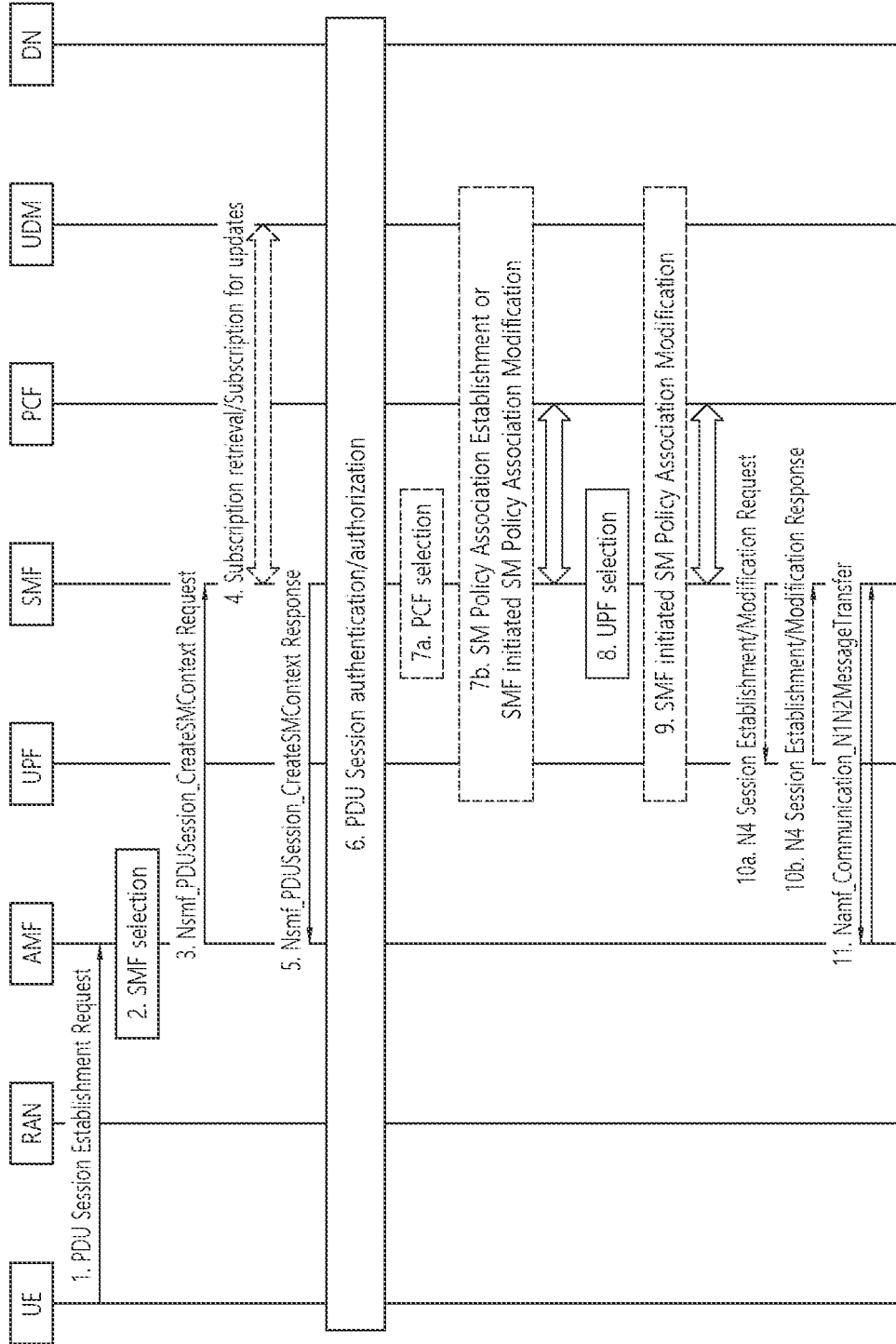
FIGS. 5a and 5b are a signal flowchart illustrating an exemplary PDU session establishment procedure.
Figure 5B:
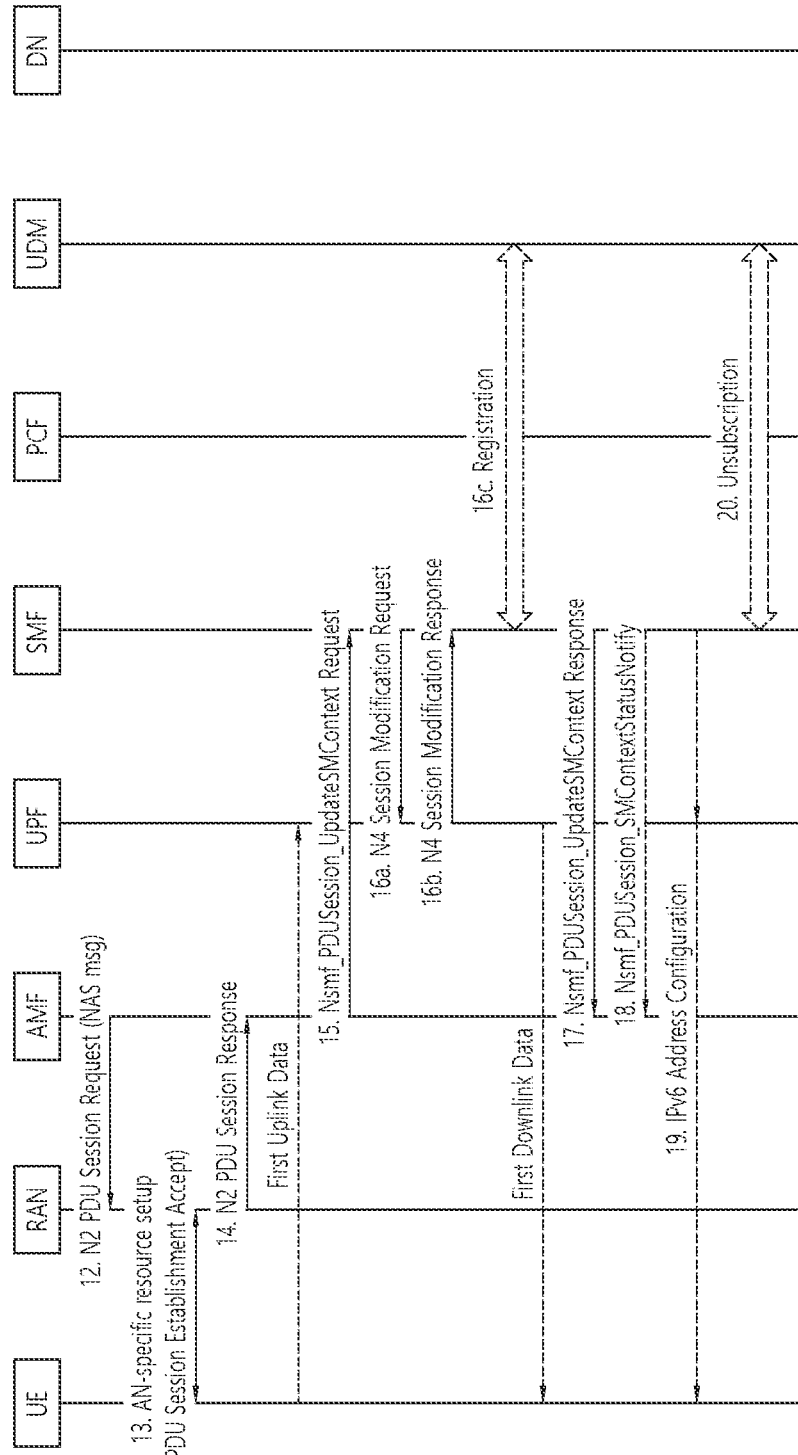

FIGS. 5a and 5b are a signal flowchart illustrating an exemplary PDU session establishment procedure.

The procedure shown in FIGS. 5a and 5b assumes that the UE has already registered on the AMF according to the registration procedure. Therefore, it is assumed that the AMF has already acquired user subscription data from UDM.

1) The UE transmits a NAS message to the AMF. The message may include Single Network Slice Selection Assistance Information (S-NSSAI), Data network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for Home Public Land Mobile Network (HPLMN).

More specifically, the UE may extract and store the allowed NSSAI and the information on the mapped NSSAI, included in the registration accept message received from the network (i.e., AMF) in the registration procedure. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

During the procedure, if the PDU Session Establishment is not successful, the SMF notifies this to the AMF.

Figure 6A:
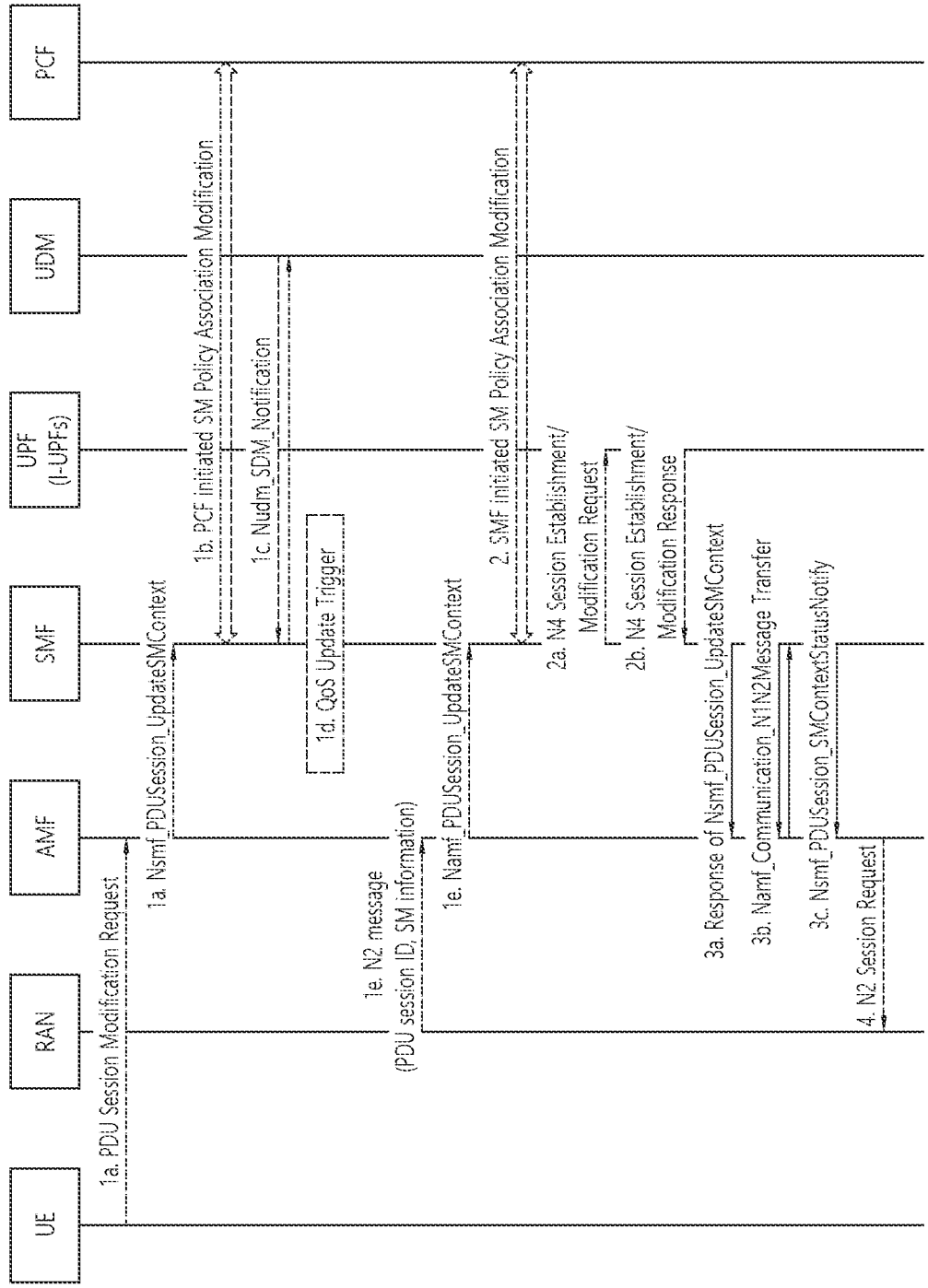

FIGS. 6a and 6b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

<RRC State>

Hereinafter, the RRC state will be described.

Figure 7:
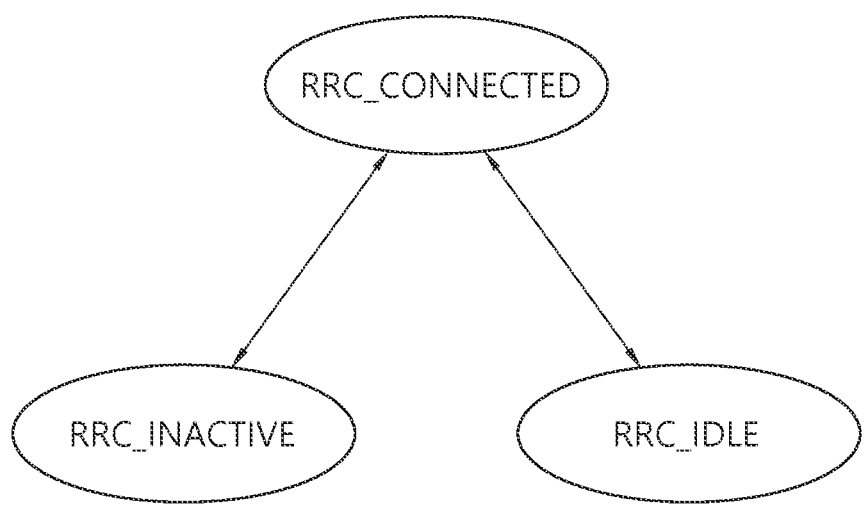
FIG. 7 shows an RRC state.

FIG. 7 shows an RRC state.

When an RRC connection is established between the RRC layer of the UE and the RRC layer of the NG-RAN (i.e., gNB), the UE is in the RRC_CONNECTED state, otherwise it is in the RRC IDLE state. In the case of NR, the RRC INACTIVE state is additionally defined, and the UE in the RRC INACTIVE state may release the connection to the base station while maintaining the connection to the core network.

<Device to Device (D2D) Communication>

On the other hand, hereinafter, D2D communication will be described.

Figure 8:
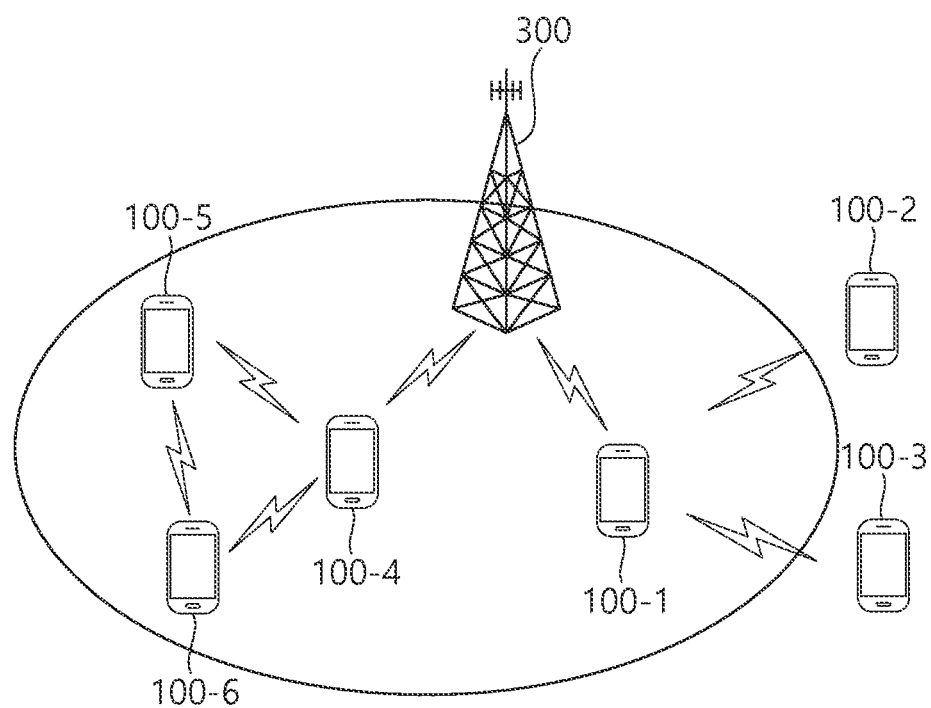
FIG. 8 shows a concept of Device to Device (D2D) communication.

FIG. 8 shows a concept of Device to Device (D2D) communication.

Due to an increase in user requirements for a Social Network Service (SNS), communication between UEs at a physically close distance, i.e., Device to Device (D2D) communication, is required. In addition, in the case of UEs used for public safety, D2D communication may be used.

In order to reflect the above requirements, as shown in FIG. 8, between UE #1 100-1, UE #2 100-2, UE #3 100-3 or between UE #4 100-4, UE #5 100-5, UE #6 100-6, a method for directly communicating without intervention of a base station (gNB) 300 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 9:
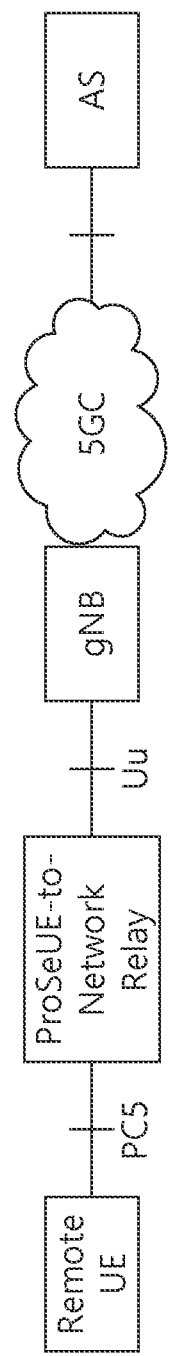
FIG. 9 shows an architecture of a UE-to-Network Relay.
Figure 10:
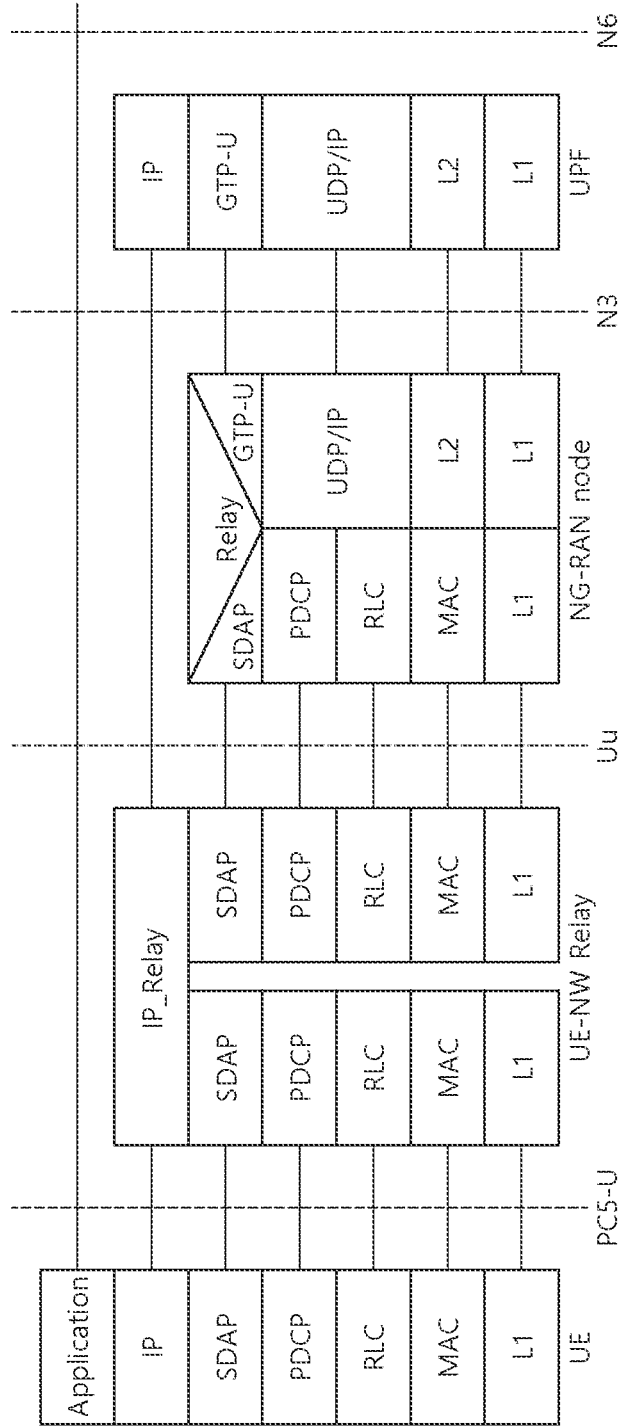
FIG. 10 shows a protocol stack for UE-to-Network Relay.

FIG. 9 shows an architecture of a UE-to-Network Relay.
FIG. 10 shows a protocol stack for UE-to-Network Relay.

Referring to FIG. 9, UE-to-Network Relay supports the network connection of the remote UE.

The PC5 link is the interface between the UE and the UE-to-Network Relay. The Uu link is the interface between the UE-to-Network Relay and the base station.

If the UE has established a PC5 link with the UE-to-Network Relay, the UE is considered a remote UE.

Communication between the remote UE and the UE-to-Network Relay is performed as one-to-one direct communication.

Meanwhile, in the past, UE-to-Network Relay supported only one-hop, but recently, UE-to-Network Relay needs to be improved to support multi-hop.

<Method of Selectively Activating and Deactivating UP Connection of PDU Session>

Meanwhile, in 5GS, a method of activating or deactivating a User Plane (UP) connection for each PDU session has been defined.

Specifically, it is as follows.

This content applies to the case when a UE has established multiple PDU Sessions. The activation of a UP connection of an existing PDU Session includes the activation of User Plane connection (i.e., data bearer and N3 tunnel) between the UE and a core network (CN).

For the UE in the CM-IDLE state in 3GPP access, either UE or network-triggered service request procedure may support independent activation of UP connection of PDU session. For the UE in the CM-IDLE state in non-3GPP access, UE-triggered service request procedure allows the re-activation of UP connection of PDU sessions, and may support independent activation of UP connection of PDU Session.

A UE in the CM-CONNECTED state may perform a service request procedure to request the independent activation of the UP connection of PDU Sessions.

Re-activation of UP connection of PDU Sessions by the network may be handled as follows:

If the UE state in the AMF is CM-CONNECTED state on the access (e.g., 3GPP access or non-3GPP access) associated to the PDU Session in the SMF, the network may re-activate the UP connection of a PDU Session using a service request procedure.

otherwise

If the UE is registered in both 3GPP access and non-3GPP access and the UE state in the AMF is CM-IDLE state in non-3GPP access, the UE can receive a paging message or a notification message through the 3GPP access for a PDU Session associated to the SMF.

If the UE state in the AMF is CM-IDLE state in 3GPP access, the paging message may include the access type associated with the PDU Session in the SMF. The UE, upon reception of the paging message containing the information on the access type, may reply to the 5GC via the 3GPP access using the NAS service request message, which contains the list of PDU Sessions associated with the received access type and whose UP connections can be re-activated over 3GPP access. If the PDU Session for which the UE has received a paging message is included in the list of the PDU Sessions in the NAS service request and the paging message was received by downlink data, the 5GC may re-activate the PDU Session UP connection over 3GPP access. If the paging message was received by downlink signaling, the service request message may succeed without re-activating the PDU session UP connection over the 3GPP access and the downlink signaling may be delivered to the UE over the 3GPP access.

If the UE state in the AMF is CM-CONNECTED state in 3GPP access, the notification message may include information on the non-3GPP access type. The UE, upon reception of the notification message, may reply to the 5GC using the NAS service request message, which contains the list of allowed PDU Sessions that can be re-activated over 3GPP access or an empty list of allowed PDU Sessions if no PDU Sessions are allowed to be re-activated over 3GPP access.

If the UE is registered in both 3GPP access and non-3GPP access served by the same AMF and the UE state in the AMF is CM-IDLE state in 3GPP access and is in CM-CONNECTED state in non-3GPP access, the UE may receive a notification message through the non-3GPP access for a PDU Session associated to the SMF. The notification message may include information on the 3GPP access type. Upon reception of the notification message, when 3GPP access is available, the UE may reply to the 5GC via the 3GPP access using the NAS service request message.

The PDU Session may be established as an always-on PDU Session.

The deactivation of the UP connection of an PDU Session includes the corresponding data bearer and N3 tunnel to be deactivated. The UP connection of different PDU Sessions may be deactivated independently. At the deactivation of the UP of a PDU Session using a N9 tunnel whose end-point is controlled by an I-SMF, the N9 tunnel may be preserved. If a PDU Session is an always-on PDU Session, the SMF may not deactivate a UP connection of PDU Session.

Figure 11:
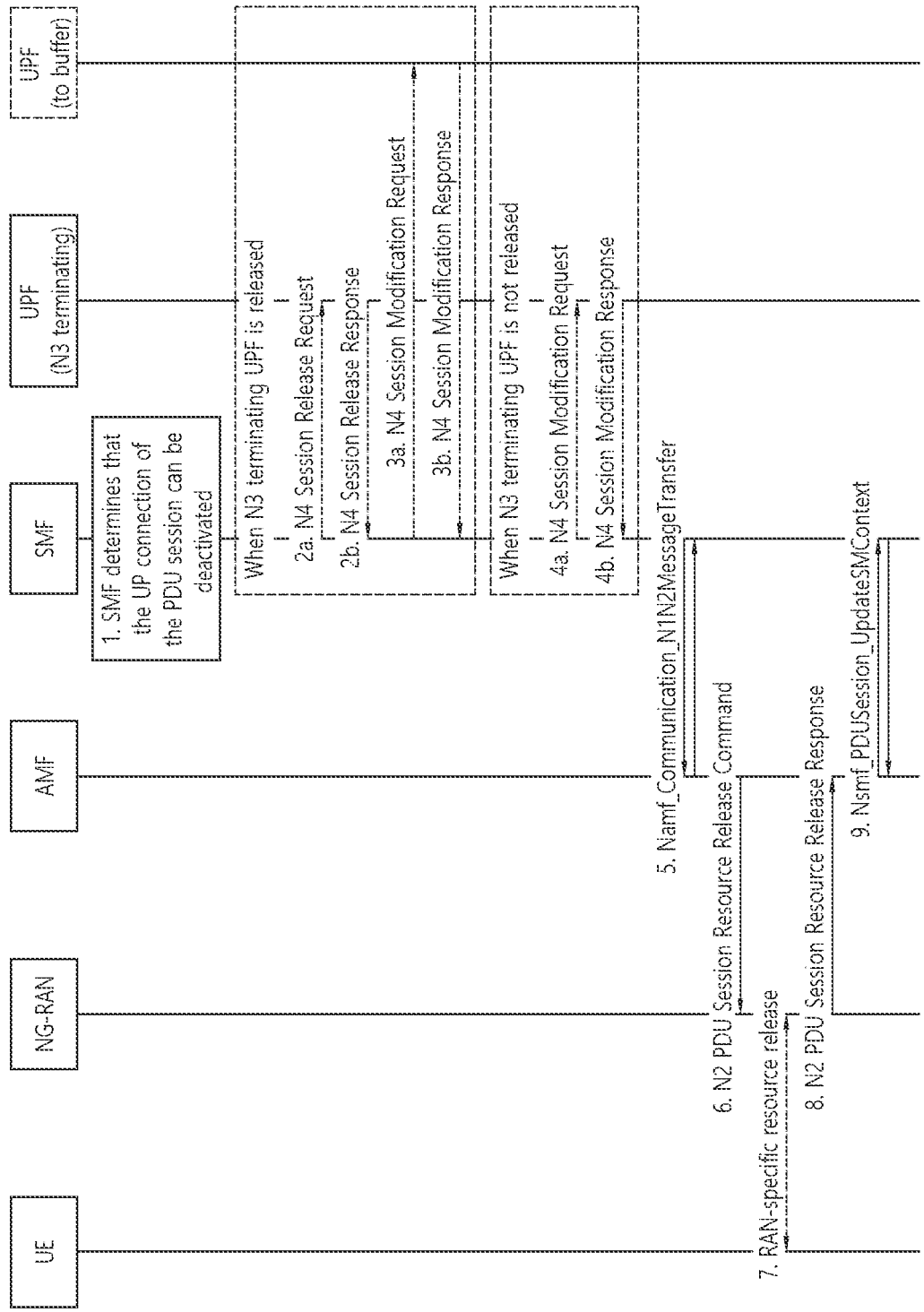
FIG. 11 is an exemplary flowchart illustrating a procedure for a network to selectively deactivate a UP connection of a PDU session.

FIG. 11 is an exemplary flowchart illustrating a procedure for a network to selectively deactivate a UP connection of a PDU session.

The following procedure is used to deactivate UP connection for a PDU Session of a UE in CM-CONNECTED state. For an always-on PDU Session, the SMF may not configure the UPF to report inactivity.

Step 1. The SMF may determine that the UP connection of the PDU Session can be deactivated in following cases:

During handover procedure, if all the QoS Flows of a PDU Session are rejected by the target NG-RAN, or if a PDU Session is failed to setup indicated by the AMF.

The UPF detects that the PDU Session has no data transfer for a specified Inactivity period;

For a LADN PDU Session, the AMF notifies to the SMF that the UE moved out of the LADN service area; or The AMF notifies to the SMF that the UE moved out of the allowed area.

The SMF may decide to release the UPF of N3 terminating point. In that case, the SMF proceeds with step 2 and step 3. Otherwise, if the SMF decides to keep the UPF of N3 terminating points, the SMF may proceed with step 4.

Step 2. The SMF may initiate an N4 Session Release procedure to release the intermediate UPF of N3 terminating point. If there are multiple intermediate UPFs, this step can be performed for each UPFs to be released. The SMF may initiate N4 Session Modification procedure to the UPF (i.e., N9 terminating point or PDU Session Anchor) connecting to the released UPF.

Step 3. If the intermediate UPF(s) of N3 terminating point is released in step 2, the SMF initiates an N4 Session Modification procedure towards the UPF connecting to the released UPF, indicating the need to remove AN Tunnel Info for N3 tunnel of the corresponding PDU Session. In this case, the UPF connecting to the released UPF may buffer the DL packets for this PDU Session or drop the DL packets for this PDU session or forward the DL packets for this PDU session to the SMF, based on buffering instruction provided by the SMF. When the PDU Session corresponds to a LADN, the SMF may notify the UPF connecting to the released UPF to discard downlink data for the PDU Sessions and/or to not provide further Data Notification messages.

Otherwise, N4 Session Modification procedure may occur toward N3 terminating point.

Step 4. If the UPF of N3 terminating point is not released in step 2, the SMF may initiate an N4 Session Modification procedure indicating the need to remove AN Tunnel Info for N3 tunnel of the corresponding PDU Session.

In this case, the UPF may buffer the DL packets for this PDU Session or drop the DL packets for this PDU session or forward the DL packets for this PDU session to the SMF, based on buffering instruction provided by the SMF. When the PDU Session corresponds to a LADN, the SMF may notify the UPF to discard downlink data for the PDU Sessions and/or to not provide further Data Notification messages.

Step 5. The SMF may transmit the Namf_Communication_N1N2MessageTransfer message to release the NG-RAN resources associated with the PDU Session. The message may include PDU Session ID, and N2 SM Information. The N2 SM Information may include N2 Resource Release Request. The N2 Resource Release Request may include PDU Session ID.

Step 6. The AMF may send the N2 PDU Session Resource Release Command including N2 SM information received from the SMF.

Step 7. The NG-RAN may issue NG-RAN specific signalling exchange (e.g., RRC Connection Reconfiguration) with the UE to release the NG-RAN resources related to the PDU Session received from the AMF. When a User Plane connection for a PDU Session is released, the AS layer in the UE indicates it to the NAS layer.

If the UE is in RRC inactive state, this step may be skipped. When the UE becomes RRC connected state from RRC inactive state, the NG-RAN and UE synchronize the released radio resources for the deactivated PDU Session.

Step 8. The NG-RAN acknowledges the N2 PDU Session Resource Release Command to the AMF including N2 SM Resource Release Ack message. The N2 SM Resource Release Ack message may include User Location Information, Secondary RAT Usage Data.

Step 9. The AMF transmits the Nsmf_PDUSession_UpdateSMContext message to acknowledge the message in step 5. The Nsmf_PDUSession_UpdateSMContext message may include N2 SM Information. The N2 SM Information may include Secondary RAT Usage Data.

On the other hand, in the case of Layer-2 UE-to-Network Relay, the Relay UE and the Remote UE establish their own PDU sessions with the network, respectively. That is, although the Remote UE receives a network connection service through the Relay UE, the Remote UE is able to exchange NAS messages with the network, thereby creating or modifying a PDU session, and also performing a service request procedure for reactivating the UP connection of the PDU session.

Meanwhile, the Relay UE may share and use a Uu Data Radio Bearer (DRB) with the Remote UE. That is, the DRB used by the Relay UE to transmit and receive its own traffic can also be used for the purpose of relaying the traffic of the Remote UE.

Problems to be Solved by the Disclosure of the Present Specification

As described in step 7 of FIG. 11, when the PDU session of the UE is deactivated, the AS layer of the UE transmits to the NAS layer that the UP connection is also released according to the deactivation. Accordingly, when the UE needs to re-use the PDU session in which the UP connection has been released, it may request an operation for activating the UP connection of the PDU session from the network.

However, if the Relay UE and the Remote UE share and use the Uu DRB (hereinafter referred to as DRB), even when the PDU session of the Relay UE is deactivated, the Relay UE needs to maintain the DRB for the Remote UE.

Accordingly, a phenomenon may occur in which the Relay UE, in particular, the NAS layer of the Relay UE does not recognize whether the PDU session is deactivated. As a result, the core network considers the PDU session to be deactivated, but the Relay UE considers the PDU session to be still active, resulting in a state mismatch of the PDU session. In particular, it may cause a problem in that the Relay UE transmits traffic through the PDU session.

Disclosure of the Present Specification

Disclosures of the present specification propose a method of processing UP deactivation of a PDU session of a Relay UE in order to solve the above-described problem.

Hereinafter, in the present specification, User Equipment (UE) and a terminal are used interchangeably. In addition, UE-to-Network Relay, ProSe UE-to-Network Relay, Relay, Relay UE, UE-NW Relay, eRelay, eRelay UE, eRelay-UE, ProSe Relay, and ProSe Relay UE are used interchangeably. In addition, Remote UE, eRemote UE, eRemote-UE, ProSe Remote UE, and ProSe Remote are used interchangeably.

In the present specification, UP connection deactivation of a PDU session is used interchangeably with PDU session deactivation and UP deactivation of a PDU session. In addition, UP connection activation of a PDU session is used interchangeably with PDU session activation and UP activation of a PDU session.

The method proposed in the present specification is applicable to various services, such as eMBB, Vehicle to Everything (V2X), Public Safety, Internet of Things (IoT), IIoT, and the like.

In the present specification, PC5 may refer to only NR PC5, or may refer to both NR PC5 and LTE PC5.

In the present specification, NG-RAN may refer to only gNB or both gNB and ng-eNB.

The method for processing the PDU session deactivation of the Relay UE proposed in the present specification consists of a combination of one or more of the following operations/configurations/steps.

Figure 12A:
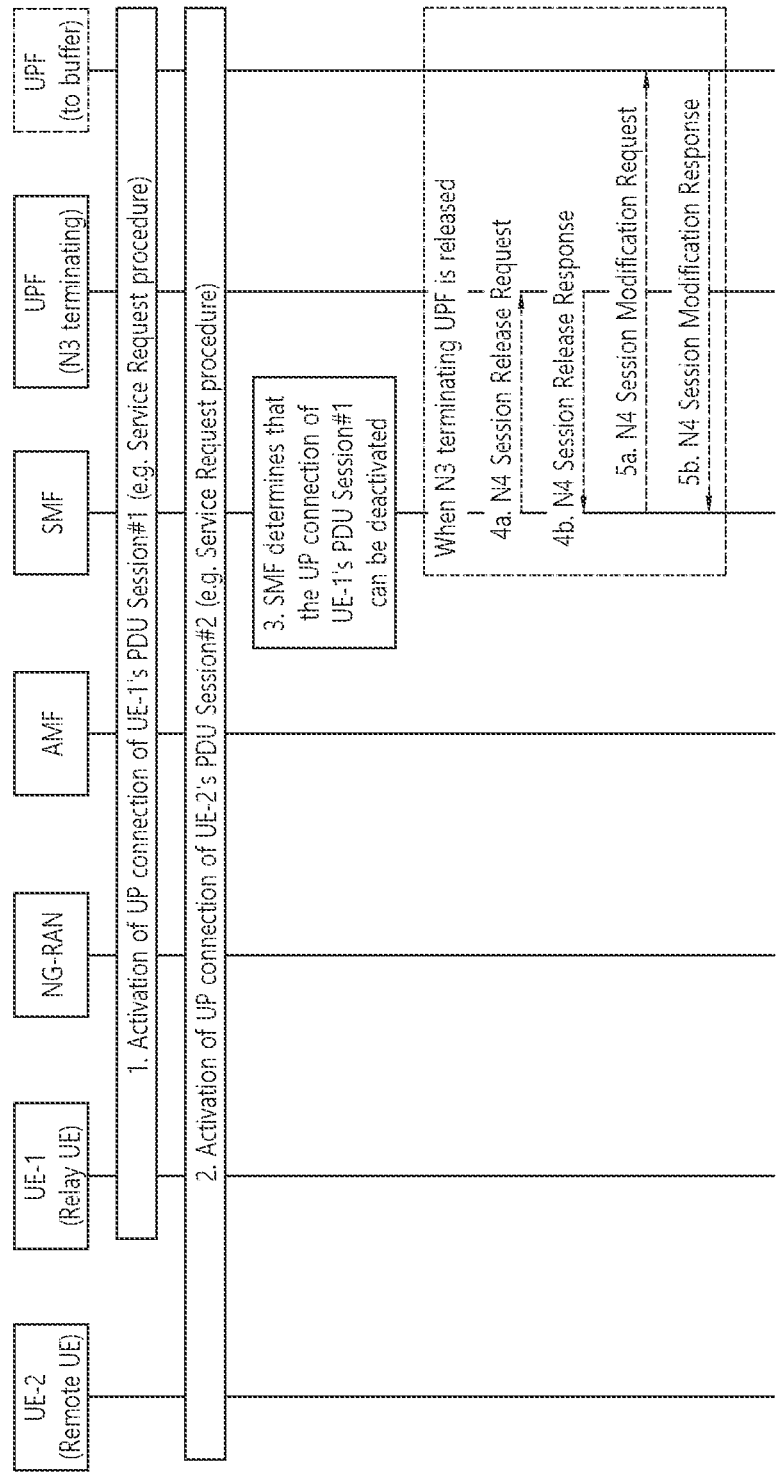
FIGS. 12a and 12b are exemplary signal flow diagrams illustrating a procedure according to one disclosure of the present specification.
Figure 12B:
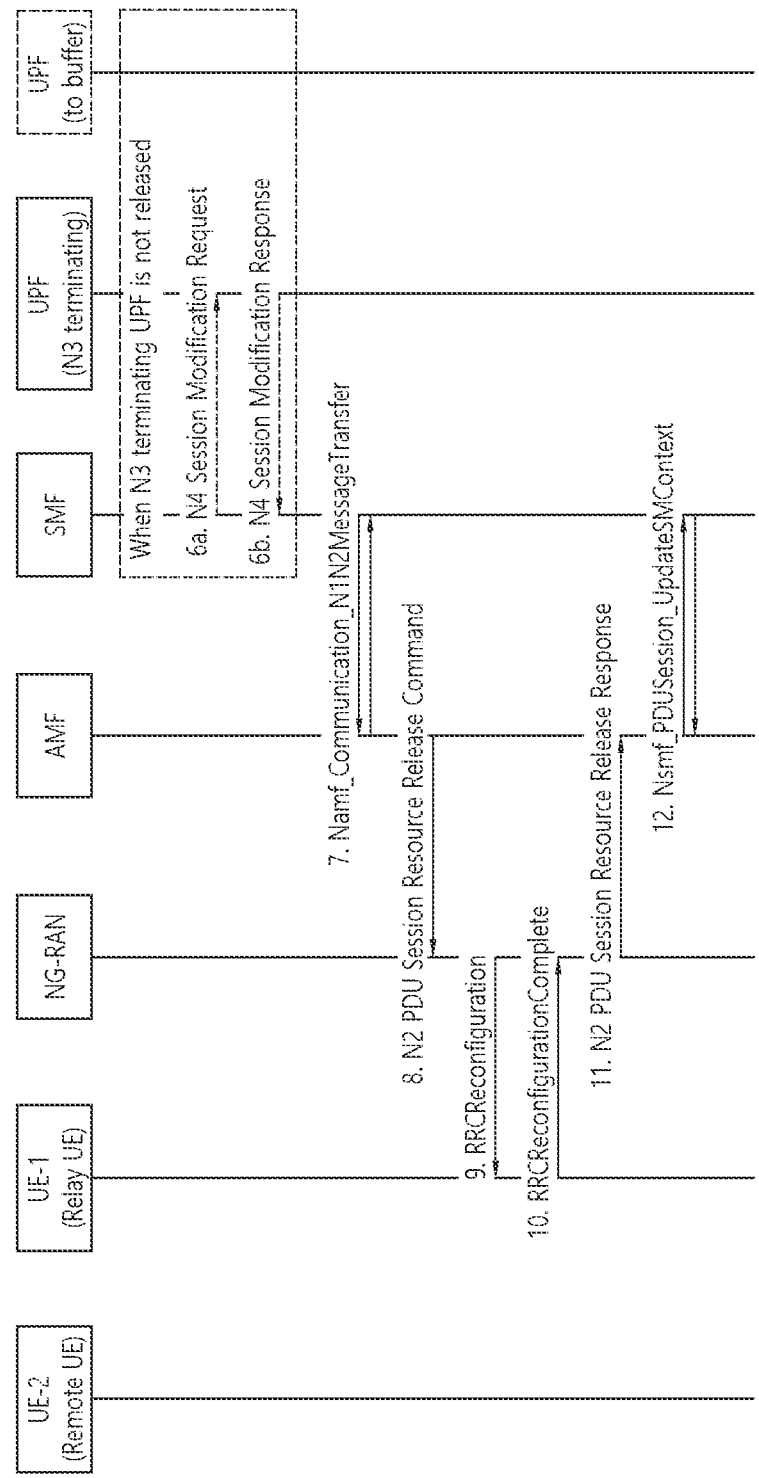

FIGS. 12a and 12b are exemplary signal flow diagrams illustrating a procedure according to one disclosure of the present specification.

In FIGS. 12a and 12b, since the UE-2 requires a network connection service, after selecting the UE-1 as a UE-to-Network Relay, one-to-one direct communication can be assumed to have been established. That is, it may be assumed that the UE-1 (i.e., Relay UE) and the UE-2 (i.e., Remote UE) establish a PC5 unicast link. Hereinafter, the PC5 unicast link is used interchangeably with the unicast link, the second layer link, the layer-2 link, and the L2 link. When the UE-1 and the UE-2 form a relationship of the Relay UE and the Remote UE (or to establish a relationship), they may interact with the network (e.g., for authentication/authorization). The serving AMF of each UE may obtain information (e.g., ID of the counterpart UE, temporary ID, etc.) of the counterpart UE and store the obtained information in the context of the serving UE. For example, the serving AMF (AMF-2) of the UE-2 that is a Remote UE may store information of the UE-1 that is a Relay UE in a context for the UE-2.

The information of the UE-1 includes a Subscription Permanent Identifier (SUPI), a 5G Globally Unique Temporary Identifier (5G-GUTI), a 5G-S-Temporary Mobile Subscriber Identity (5G-S-TMSI), 5G-TMSI, of the UE-1, and serving AMF information.

Step 1. UP connection of PDU session #1 created by the UE-1 is activated.

The UP connection of the PDU session may be activated according to various procedures including the procedure below.

PDU session establishment procedure requested by the UE
 UE-initiated service request procedure
 Network-initiated service request procedure
 Registration procedure Activating the UP connection of the PDU session involves the NG-RAN (i.e., gNB or ng-eNB) establishing a DRB with the UE. To this end, the NG-RAN (i.e., gNB or ng-eNB) may perform an RRC reconfiguration procedure or an RRC connection reconfiguration procedure with the UE.

Taking the service request procedure as an example, the NG-RAN (i.e., gNB or ng-eNB) may perform an RRC connection reconfiguration procedure with the UE based on the N2 request message received from the AMF. The NG-RAN (i.e., gNB or ng-eNB) may establish a DRB with the UE to support all QoS flows belonging to PDU Session #1 of the UE-1. For this, in the case of gNB, an RRC reconfiguration message is used, and in the case of ng-eNB, an RRC connection reconfiguration message is used.

A radioBearerConfig field is included in the RRC reconfiguration message to configure the DRB.

TABLE 3

| | RRC Reconfiguration Message | | |
|---|---|---|---|
| radioBearerConfig Field | DRB-ToAddModList | drb-Identity sdap-Config | defaultDRB |
| | drb-ToReleaseList | drb-Identity sdap-Config | defaultDRB |

The defaultDRB indicates whether a default DRB is used for a PDU session.

Since the UP connection needs to be activated for the PDU session #1 of the UE-1, DRB-ToAddModList is included in the above.

For example, if one QoS flow (QFI=0) is included in PDU session #1 of the UE-1 and one DRB is generated for this purpose, DRB-ToAddMod may be included in the form below. Below, the main Information Element (IE) will be mainly described.

i) drb-Identity=1
 ii) sdap-Config
  ii-1) pdu-Session=0
  ii-2) sdap-HeaderDL="present"
  ii-3) sdap-HeaderUL="present"
  ii-4) defaultDRB="true"
  ii-5) mappedQoS-FlowsToAdd={QFI=0}

Although it has been described above that DRB-ToAddModList and DRB-ToAddMod are used, a new IE may be defined and used for a PDU session of a UE operating as a Relay UE, or an existing IE may be modified/extended and used. For example, information informing that it is for the Relay UE itself may be explicitly or implicitly included in DRB-ToAddMod. Alternatively, information informing that the DRB may be shared between the Relay UE and the Remote UE may be explicitly or implicitly included.

The UE-1 configures the DRB for PDU Session #1 based on the DRB configuration information provided by the NG-RAN (i.e., gNB or ng-eNB).

The UE-1 and the NG-RAN (i.e., gNB or ng-eNB) store information/context for the established DRB.

Step 2. The UP connection of PDU session #2 generated by the UE-2 (i.e., Remote UE) is activated.

Since the data/traffic of the UE-2 (i.e., Remote UE) eventually goes through the E-1 (i.e., Relay UE), the NG-RAN (i.e., gNB or ng-eNB), the NG-RAN (i.e., gNB or ng-eNB) needs to add/modify/update DRB for PDU session #2 of the UE-2 to UE-1.

It is assumed that the NG-RAN (i.e., gNB or ng-eNB) already knows that the UE-2 is receiving network connection services via the UE-1 (i.e., Relay UE) through RRC connection establishment with the UE-2 (i.e., Remote UE)

The NG-RAN (i.e., gNB or ng-eNB) may determine that it can support data traffic of the UE-2 using the DRB established/configured in step 1 (i.e., DRB with drb-Identity=1). The determination may be based on the QoS characteristics (e.g., when QoS characteristics are the same/similar to share a DRB) of PDU session #1 (or QoS flow belonging thereto) of the UE-1 and PDU session #2 (or QoS flow belonging thereto) of the UE-2.

For example, two QoS flows (QFI=0 and QFI=1) may be included in PDU session #2 of the UE-2, and it may be determined to support them with the DRB with drb-Identity=1 established/configured in step 1. In this case, the NG-RAN (ie., gNB or ng-eNB) needs to configure the UE-1 (i.e., Relay UE) to modify/update the DRB. This may be interpreted as an operation of adding the two QoS flows to the DRB.

To this end, the RRC configuration message may be extended and used, or a new RRC message may be defined and used. When the new RRC message is defined, it may be for configuring DRB/Signaling Radio Bearer (SRB)/RRC for the UE-2 (i.e., Remote UE) to the UE-1 (i.e., Relay UE). This may be used when the UE-1 (i.e., Relay UE) and the UE-2 (i.e., Remote UE) share and use a Radio Bearer (RB) and/or use separately without sharing an RB.

In the following description, it is assumed that the RRC configuration message is extended and used.

In order to reflect the UP connection activation of the PDU session of the UE-2 (i.e., Remote UE), the DRB-ToAddModList may be modified/extended in the RRC Configuration message and used, or a new IE may be defined and used. Whatever method is used, the DRB configuration information provided to the Relay UE may explicitly or implicitly include information indicating that it is for the Remote UE.

Among the methods described above, if a new IE (e.g., DRB-ToAddModList-forRemoteUE) is defined and used as an example, when the NG-RAN (i.e., gNB or ng-eNB) performs an RRC connection reconfiguration procedure with the UE-1 (i.e., Relay UE), the following information may be provided for DRB modification/update. The main information is mainly described below.

i) drb-Identity=1
ii) one or more of the following
   ii-1) Information informing that it is for the Remote UE (i.e., UE-2): Information informing that the DRB configuration information provided to the Relay UE (i.e., UE-1) is for the Remote UE (i.e., UE-2) is included explicitly or implicitly.
   ii-2) ID information of the Remote UE (i.e., UE-2): This includes various types of ID information, e.g., C-RNTI, SUPI, 5G-GUTI, 5G-S-TMSI, 5G-TMSI, Layer-2 ID or the like.
   ii-3) Information informing that the DRB is shared between the Relay UE (i.e., UE-1) and the Remote UE (i.e., UE-2).
iii) sdap-Config
   iii-1) pdu-Session=1
   iii-2) sdap-HeaderDL="present"
   iii-3) sdap-HeaderUL="present"
   iii-4) defaultDRB="true"
   iii-5) mappedQoS-FlowsToAdd={QFI=0, QFI=1}

The UE-1 (i.e., Relay UE) modifies/updates the existing DRB (DRB with drb-Identity=1) based on the DRB configuration information provided by the NG-RAN (i.e., gNB or ng-eNB). According to the above example, the DRB supports one QoS flow of PDU session #1 of the UE-1 (i.e., Relay UE) and two QoS flows of PDU session #2 of the UE-2 (i.e., Remote UE).

Whether to use by modifying/extending DRB-ToAddModList in the RRC Configuration message or to define or to use a new IE to reflect the UP connection activation of the PDU session of the Remote UE (i.e., UE-2), ultimately, the purpose is to inform the Relay UE (i.e., UE-1) which DRB is to be modified/updated. So, this can be understood as appropriately providing necessary information so that the Relay UE (i.e., UE-1) can perform DRB configuration based thereon.

The UE-1 (i.e., Relay UE) and the NG-RAN (i.e., gNB or ng-eNB) store information/context for the established DRB.

Although not described in detail separately, the NG-RAN (i.e., gNB or ng-eNB) may also perform an RRC connection reconfiguration procedure for PDU session #2 of the UE-2 (i.e., UE-2) with the UE-2 through the UE-1.

Step 3. The SMF determines that the UP connection of the PDU session #1 of the UE-1 (i.e., Relay UE) can be deactivated. For details on step 3, refer to step 1 of FIG. 11.

Steps 4-8. This will refer to steps 2 to 6 of FIG. 11.

Step 9. In order to reflect deletion for the PDU session #1 of the UE-1 from the DRB shared and used by the Relay UE (i.e., UE-1) and the Remote UE (i.e., UE-2), i.e., the DRB with drb-Identity=1, the NG-RAN (i.e., gNB or ng-eNB) performs an RRC reconfiguration procedure or RRC connection reconfiguration procedure with the UE-1 (i.e., Relay UE).

Specifically, in order to cause the UE-1 (i.e., Relay UE) to delete information on PDU session #1 of the UE-1 (i.e., relay UE) configured in the DRB in step 1, the NG-RAN (i.e., gNB or ng-eNB) transmits an RRC reconfiguration message or an RRC connection reconfiguration message.

For example, the NG-RAN (i.e., gNB or ng-eNB) may provide the DRB-ToAddMod including the following main information in the DRB-ToAddModList of the RRC reconfiguration message or the RRC connection reconfiguration message.
i) drb-Identity=1
ii) sdap-Config
   ii-1) pdu-Session=0
   ii-2) sdap-HeaderDL="present"
   ii-3) sdap-HeaderUL="present"
   ii-4) defaultDRB="true"
   ii-5) mappedQoS-FlowsToRelease={QFI=0}

As another example, the NG-RAN (i.e., gNB or ng-eNB) may provide DRB-ToReleaseList={1} in an RRC reconfiguration message or an RRC connection reconfiguration message.

The DRB configuration information of the NG-RAN (i.e., gNB or ng-eNB) as described above may be implicitly or explicitly include information informing that the DRB is shared between the Relay UE (i.e., UE-1) and the Remote UE (i.e., UE-2).

Due to the DRB configuration (or DRB modification/update configuration, or RRC reconfiguration) of the NG-RAN (i.e., gNB or ng-eNB), the UE-1 (i.e., Relay UE) may determine that its own PDU session PDU Session #1 has been deleted/removed in the DRB with drb-Identity=1. This may be interpreted as the UE-1 may determine that the DRB with drb-Identity=1 still exists for the Remote UE (i.e., UE-2).

Although the DRB itself with drb-Identity=1 is not released/removed, the UE-1 (i.e., relay UE) may determine that the DRB has been released/removed for itself. As a result, the AS layer of the UE-1 (i.e., Relay UE) informs the NAS layer that the UP connection of the PDU session #1 (which is its own PDU session #1) is released (or provides information informing this). For this reason, when the UE-1 (i.e., Relay UE) needs to use PDU session #1 in the future, a request for activating the UP connection for PDU session #1 may be performed to the network.

Although it has been described that the DRB-ToAddModList and DRB-ToAddMod or the existing DRB-ToReleaseList are used, for a PDU session of the UE-1 operating as a Relay UE, a new IE may be defined and used, or an existing IE may be modified/extended and used. For example, information informing that it is for the Relay UE itself may be explicitly or implicitly included in DRB-ToAddMod. Alternatively, information informing that it is for the Relay UE itself may be explicitly or implicitly included in the DRB-ToReleaseList.

The UE-1 (i.e., Relay UE) and the NG-RAN (i.e., gNB or ng-eNB) store information/context for the modified/updated DRB.

Step 10. The UE-1 (i.e., Relay UE) transmits an RRC Reconfiguration Complete message to respond to the RRC reconfiguration message of the NG-RAN (i.e., gNB or ng-eNB).

Steps 11-12. This will refer to steps 8 to 9 of FIG. 11.

FIGS. 12*a* and 12*b* show that the SMF and UPF for PDU Session #1 of the UE-1 and the SMF and UPF for PDU Session #2 of the UE-2 are the same, but different SMFs may be used, and different UPFs may be used.

Figure 13:
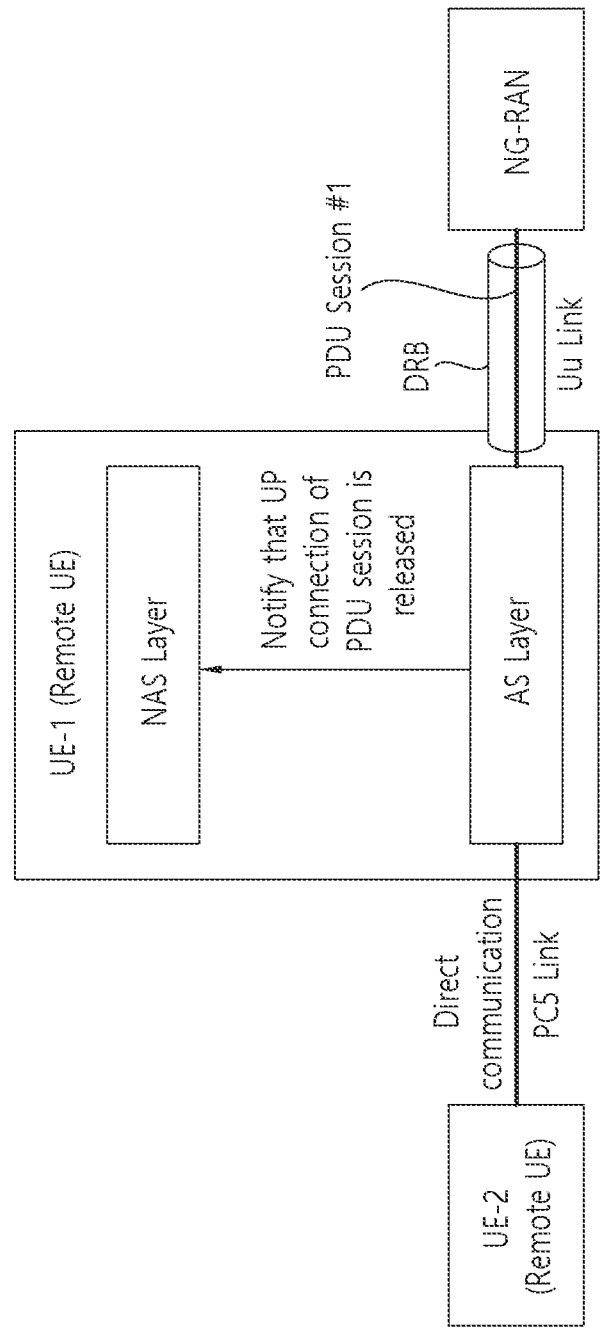
FIG. 13 is an exemplary diagram illustrating an internal operation of the UE-1 (Relay UE) shown in FIGS. 12a and 12b.

FIG. 13 is an exemplary diagram illustrating an internal operation of the UE-1 (Relay UE) shown in FIGS. 12*a* and 12*b*.

According to steps 3 to 9 of FIGS. 12*a* and 12*b*, when the UP connection of PDU session #1 of the UE-1 (i.e., Relay UE) is deactivated and the RRC connection reconfiguration procedure is performed accordingly, PDU session #1 of the UE-1 may be deleted from the DRB.

Then, the AS layer of the UE-1 (i.e., Relay UE) may notify the NAS layer that the UP connection of its PDU session #1 has been released.

For this reason, when the UE-1 (i.e., Relay UE) needs to use PDU session #1 in the future, a request for activating the UP connection for PDU session #1 may be performed to the network.

Effects according to the disclosure of the present specification are as follows.

When the Relay UE and the Remote UE share and use the DRB, the DRB needs to be maintained for the Remote UE even though the PDU session of the Relay UE is deactivated. Accordingly, a phenomenon may occur in which the Relay UE, in particular, the NAS layer of the Relay UE does not recognize whether the PDU session is deactivated. Thereby, the core network considers the PDU session to be deactivated, but the Relay UE considers the PDU session to be still active, which may cause a PDU session state mismatch. The disclosure of the present specification ensures that there is no such mismatch state. That is, the disclosure of the present specification enables the NAS layer of the Relay UE to recognize that the PDU session is deactivated.

Hereinafter, an apparatus to which the above disclosure of the present specification can be applied will be described.

Figure 14:
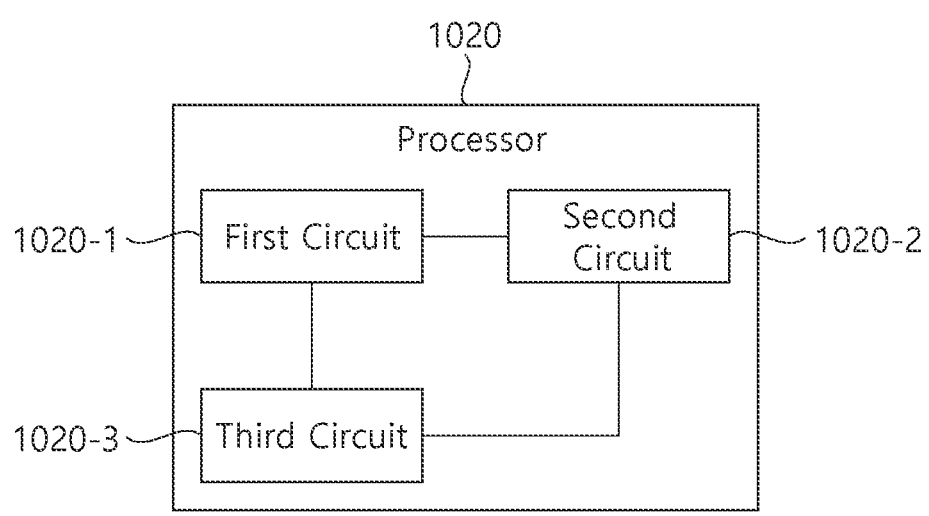
FIG. 14 shows a block diagram of a processor in which the disclosure of the present specification is implemented.

FIG. 14 shows a block diagram of a processor in which the disclosure of the present specification is implemented.

As can be seen with reference to FIG. 14, a processor 1020 in which the disclosure of the present specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be a Relay UE or a Remote UE.

A case in which the processor is included in the Relay UE will be described first.

The first circuit 1020-1 of the processor may receive a Radio Resource Control (RRC) reconfiguration message or an RRC connection reconfiguration message from a base station.

The RRC reconfiguration message or the RRC connection reconfiguration message may include identification information of a Data Radio Bearer (DRB) shared with the Remote UE and information on a Protocol Data Unit (PDU) session to be deleted or released in the DRB.

The second circuit 1020-2 of the processor may deliver, by an Access Stratum (AS) layer of the Relay UE to a Non-Access Stratum (NAS) layer of the Relay UE, information that a User Plane (UP) connection of the PDU session is released, based on the received RRC reconfiguration message or the RRC connection reconfiguration message.

The information on the PDU session to be deleted or released in the DRB may be information on a PDU session of the Relay UE.

Data traffic of the Remote UE may be relayed through the DRB.

The third circuit 1020-3 of the processor may transmit an RRC Reconfiguration Complete message in response to reception of the RRC reconfiguration message or the RRC connection reconfiguration message.

A fourth circuit (not shown) of the processor may determine, by the Relay UE, to reuse the PDU session for itself. A fifth circuit (not shown) of the processor may transmit a service request message.

A sixth circuit (not shown) of the processor may receive an RRC reconfiguration message or an RRC connection reconfiguration message to activate the UP connection of the PDU session.

A seventh circuit (not shown) of the processor may established, by the Relay UE, one-to-one direct communication with the Remote UE.

In case that it is determined that the DRB used to transmit the data traffic of the Relay UE is used to relay the data traffic of the Remote UE, an eighth circuit (not shown) of the processor may receive an RRC reconfiguration message or an RRC connection reconfiguration message from the base station.

The RRC reconfiguration message or the RRC connection reconfiguration message may include one or more of: identification information of the DRB, information informing that it is for the Remote UE, ID information of the Remote UE, or information on the PDU session of the Remote UE.

Figure 15:
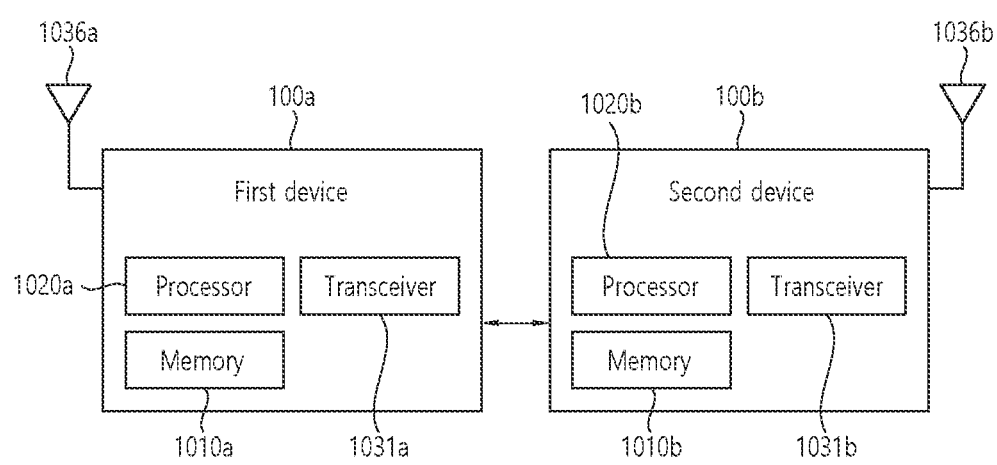
FIG. 15 illustrates a wireless communication system according to an embodiment.

FIG. 15 illustrates a wireless communication system according to an embodiment.

Referring to FIG. 15, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as a memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 16:
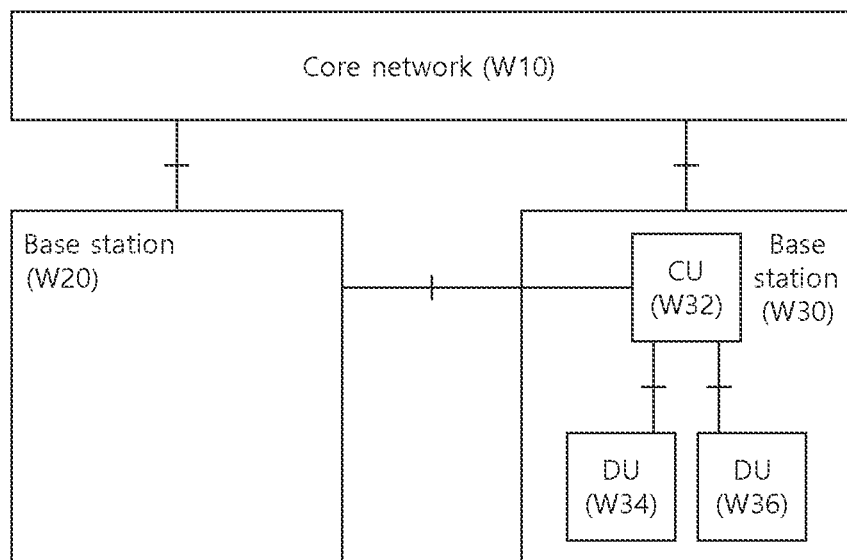
FIG. 16 illustrates a block diagram of a network node according to an embodiment.

FIG. 16 illustrates a block diagram of a network node according to an embodiment.

In particular, FIG. 16 is a diagram illustrating in detail a case in which a base station is divided into a Central Unit (CU) and a Distributed Unit (DU).

Referring to FIG. 16, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 17:
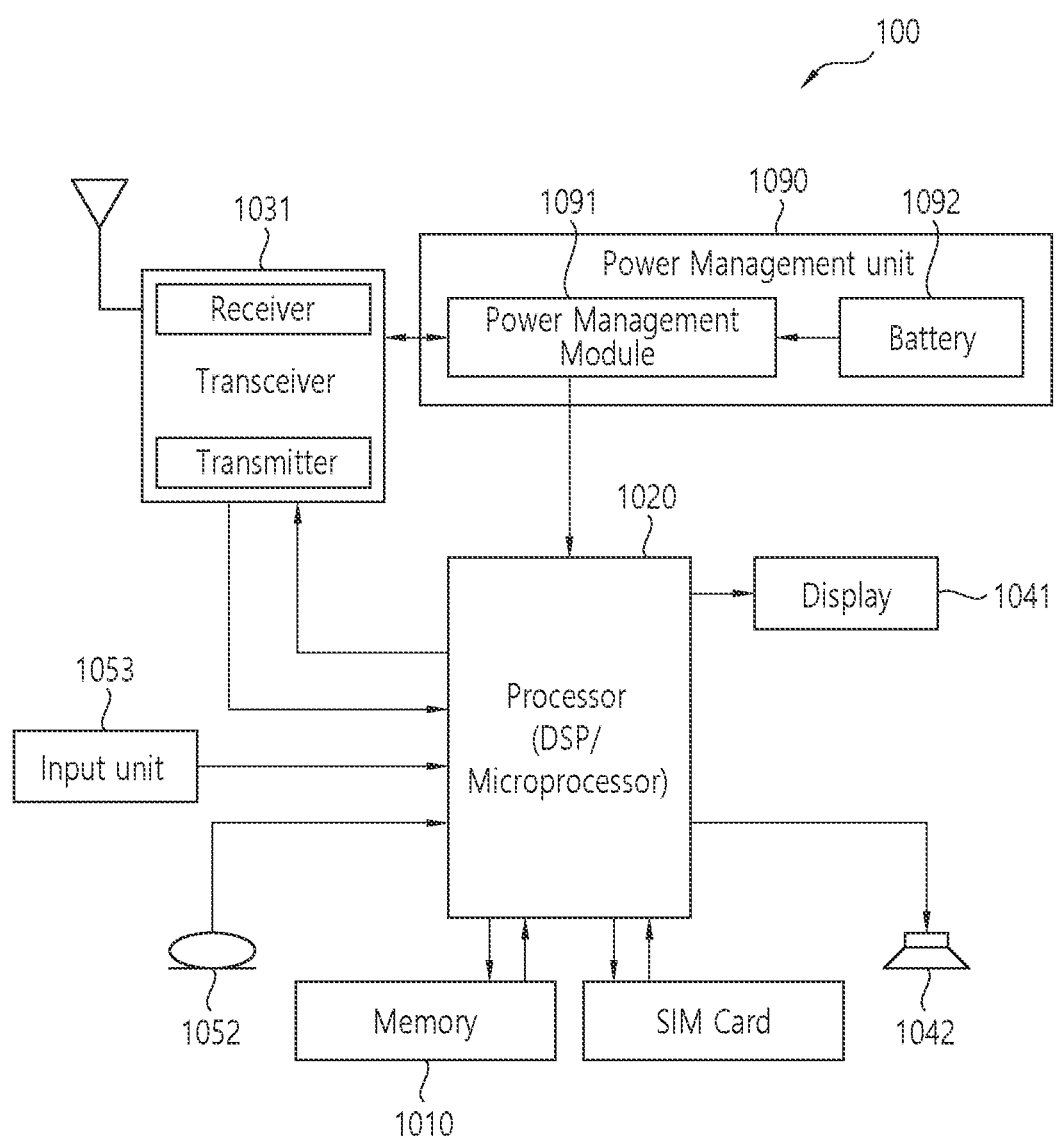
FIG. 17 is a block diagram illustrating a configuration of a UE according to an embodiment.

FIG. 17 is a block diagram illustrating a configuration of a UE according to an embodiment.

In particular, the UE 100 shown in FIG. 17 is a diagram illustrating the first device of FIG. 15 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 18:
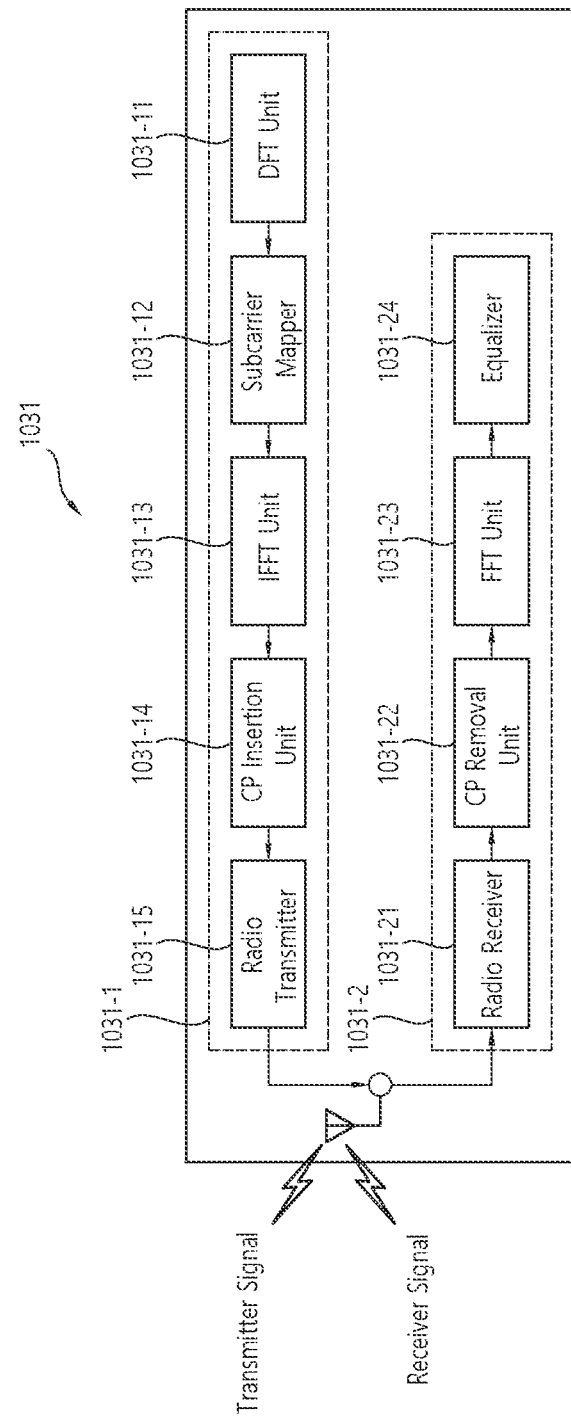
FIG. 18 is a detailed block diagram illustrating the transceiver of the first device shown in FIG. 15 or the transceiver of the device shown in FIG. 17 in detail.

FIG. 18 is a detailed block diagram illustrating the transceiver of the first device shown in FIG. 15 or the transceiver of the device shown in FIG. 17 in detail.

Referring to FIG. 18, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 19:
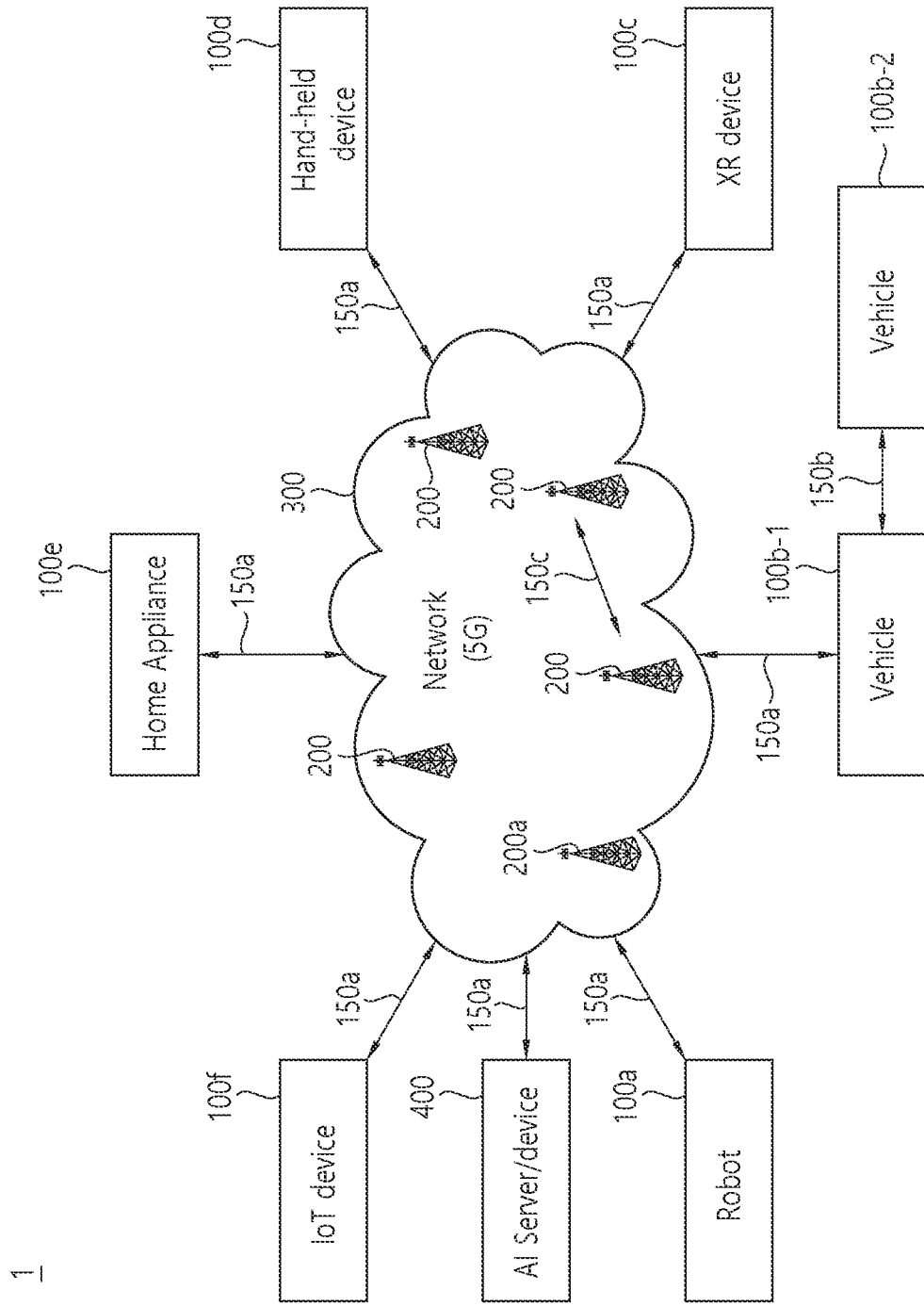
FIG. 19 illustrates a communication system 1 applied to the disclosure of the present specification.

FIG. 19 illustrates a communication system 1 applied to the disclosure of the present specification.

Referring to FIG. 19, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*, an Internet-of-Things (IoT) device 100*f*, and an AI device/ server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by a first terminal in a wireless communication system, the method comprising:
    establishing, by the first terminal, one-to-one direct communication with a second terminal;
    establishing, by the first terminal, a radio bearer in which a session of the first terminal is added;
    based on the radio bearer supporting a session of the second terminal, modifying, by the first terminal, the radio bearer to add the session of the second terminal,
    wherein modifying the radio bearer comprises receiving, from a base station, a first reconfiguration message including i) identification (ID) information for the radio bearer, ii) ID information for the second terminal, iii) information informing that the radio bearer is shared by the first terminal and the second terminal, and iv) information for the session of the second terminal;
    receiving, by the first terminal, a second reconfiguration message from the base station,
    wherein the second reconfiguration message includes i) the ID information for the radio bearer and ii) information for the session of the first terminal to be deleted or released in the radio bearer; and
    delivering, by an Access Stratum (AS) layer of the first terminal to a Non-Access Stratum (NAS) layer of the first terminal, information informing that a user plane connection of the session of the first terminal is released, based on the received second reconfiguration message.

2. The method of claim 1, wherein data traffic of the second terminal is relayed through the radio bearer.

3. The method of claim 1, wherein the method further comprises transmitting an RRC a Reconfiguration Complete message in response to reception of the second reconfiguration message.

4. The method of claim 1, wherein the method further comprises:
    determining, by the first terminal, to reuse the session for itself; and
    transmitting a service request message.

5. The method of claim 4, wherein the first reconfiguration message is used to activate a user plane connection of the session of the second terminal.

6. A chipset mounted on a first terminal in a wireless communication system, the chipset comprising:
    at least one processor; and
    at least one memory for storing instructions and operably electrically connectable to the at least one processor, wherein the instructions, based on being executed by the at least one processor, cause the at least one processor to perform operations comprising:

establishing one-to-one direct communication with a second terminal;

establishing a radio bearer in which a session of the first terminal is added;

based on the radio bearer supporting a session of the second terminal, modifying the radio bearer to add the session of the second terminal, wherein modifying the radio bearer comprises receiving, from a base station, a first reconfiguration message including i) identification (ID) information for the radio bearer, ii) ID information for the second terminal, iii) information informing that the radio bearer is shared by the first terminal and the second terminal, and iv) information for the session of the second terminal;

receiving a second reconfiguration message from the base station, wherein the second reconfiguration message includes i) the ID information for the radio bearer and ii) information for the session of the first terminal to be deleted or released in the radio bearer; and delivering, by an Access Stratum (AS) layer to a Non-Access Stratum (NAS) layer, information informing that a user plane connection of the session of the first terminal is released, based on the received second reconfiguration message.

7. The chipset of claim 6, wherein data traffic of the second terminal is relayed through the radio bearer.

8. The chipset of claim 6, wherein the operations further comprise transmitting a Reconfiguration Complete message in response to reception of the second reconfiguration message.

9. The chipset of claim 6, wherein the operations further comprise:
determining to reuse the session for itself; and
transmitting a service request message.

10. A first terminal in a wireless communication system, the first terminal comprising:
at least one transceiver;
at least one memory; and
at least one processor operably electrically connectable to the at least one transceiver and the at least one memory,
wherein the at least one memory stores instructions, based on being executed by the at least one processor, causing the at least one processor to perform operations comprising:

establishing one-to-one direct communication with a second terminal;

establishing a radio bearer in which a session of the first terminal is added;

based on the radio bearer supporting a session of the second terminal, modifying the radio bearer to add the session of the second terminal, wherein modifying the radio bearer comprises receiving, from a base station via the at least one transceiver, a first reconfiguration message including i) identification (ID) information for the radio bearer, ii) ID information for the second terminal, iii) information informing that the radio bearer is shared by the first terminal and the second terminal, and iv) information for the session of the second terminal;

receiving, via the at least one transceiver, a second reconfiguration message from the base station, wherein the second reconfiguration message includes i) the ID information for the radio bearer and ii) information for the session of the first terminal to be deleted or released in the radio bearer; and delivering, by an Access Stratum (AS) layer to a Non-Access Stratum (NAS) layer, information informing that a user plane connection of the session of the first terminal is released, based on the received second reconfiguration message.

* * * * *